(12) United States Patent
Naidoo

(10) Patent No.: US 10,364,355 B2
(45) Date of Patent: Jul. 30, 2019

(54) ASPHALT COMPOSITIONS, ASPHALT PRODUCTS MADE FROM SUCH ASPHALT COMPOSITIONS, AND THE METHODS OF MAKING AND USING SUCH COMPOSITIONS AND PRODUCTS

(71) Applicant: SHAMROCK M.E.D., LLC, Diamondhead, MS (US)

(72) Inventor: Taryn Naidoo, Diamondhead, MS (US)

(73) Assignee: SHAMROCK M.E.D. LLC, Diamondhead, MS (US)

( * ) Notice: Subject to any disclaimer, the term of this patent is extended or adjusted under 35 U.S.C. 154(b) by 98 days.

(21) Appl. No.: 14/600,844

(22) Filed: Jan. 20, 2015

(65) Prior Publication Data

US 2016/0208098 A1    Jul. 21, 2016

(51) Int. Cl.

| | |
|---|---|
| *C08L 95/00* | (2006.01) |
| *E01C 7/32* | (2006.01) |
| *E04D 1/20* | (2006.01) |
| *C08L 91/06* | (2006.01) |
| *E01C 7/35* | (2006.01) |
| *E01C 11/00* | (2006.01) |

(52) U.S. Cl.
CPC ............... *C08L 95/00* (2013.01); *C08L 91/06* (2013.01); *E01C 7/32* (2013.01); *E01C 7/35* (2013.01); *E01C 11/005* (2013.01); *E04D 1/20* (2013.01); *C08L 2555/52* (2013.01); *C08L 2555/64* (2013.01)

(58) Field of Classification Search
None
See application file for complete search history.

(56) References Cited

U.S. PATENT DOCUMENTS

| | | | | |
|---|---|---|---|---|
| 8,076,399 | B2 * | 12/2011 | Laurens | C08L 91/00 524/272 |
| 2008/0009567 | A1 * | 1/2008 | Hergenrother | C08L 95/00 524/64 |
| 2008/0161451 | A1 * | 7/2008 | Lommerts | C08L 95/00 524/71 |
| 2010/0147190 | A1 * | 6/2010 | Naidoo | C08L 91/00 106/229 |
| 2011/0184090 | A1 * | 7/2011 | De Jonge | E01C 7/265 523/351 |
| 2011/0206455 | A1 * | 8/2011 | Blacklidge | E01C 7/185 404/17 |

OTHER PUBLICATIONS

AASHTO T49-07 Test Method, Dec. 2011.*

\* cited by examiner

*Primary Examiner* — Randy Gulakowski
*Assistant Examiner* — Christopher M Rodd
(74) *Attorney, Agent, or Firm* — J.M. (Mark) Gilbreth; Gilbreth Roebuck, PC

(57) ABSTRACT

Paving compositions comprising asphalt cement, wherein the asphalt cement may have a with a pen value greater than 50 dmm at 25° C., and the composition may further include a an aminated wax, a rejuvenator and/or a polymeric component. Paving structures include a substrate pavement layer with a tack coat applied thereto, and methods of making a paving structure include applying a tack coat to a substrate pavement layer, wherein the tack coat comprises asphalt cement, wherein the asphalt cement may have a with a pen value greater than 50 dmm at 25° C., and the tack coat may further include a an aminated wax, a rejuvenator and/or a polymeric component.

33 Claims, 4 Drawing Sheets

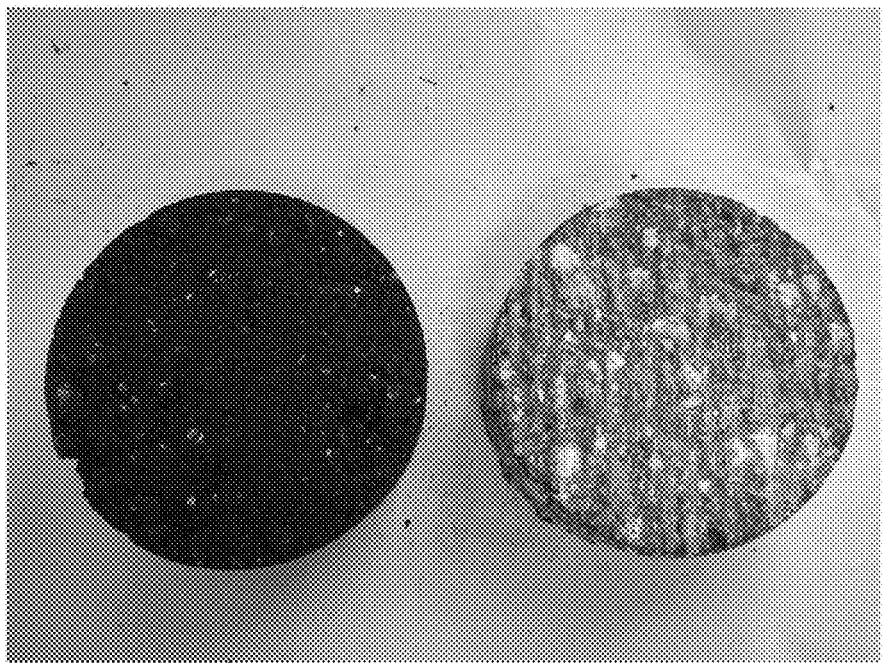
FIG. 1 Milled (right) and Unmilled (left) Substrate Samples
FIG. 2 Substrate Samples at 0.08 gallon / square yard Application Rate

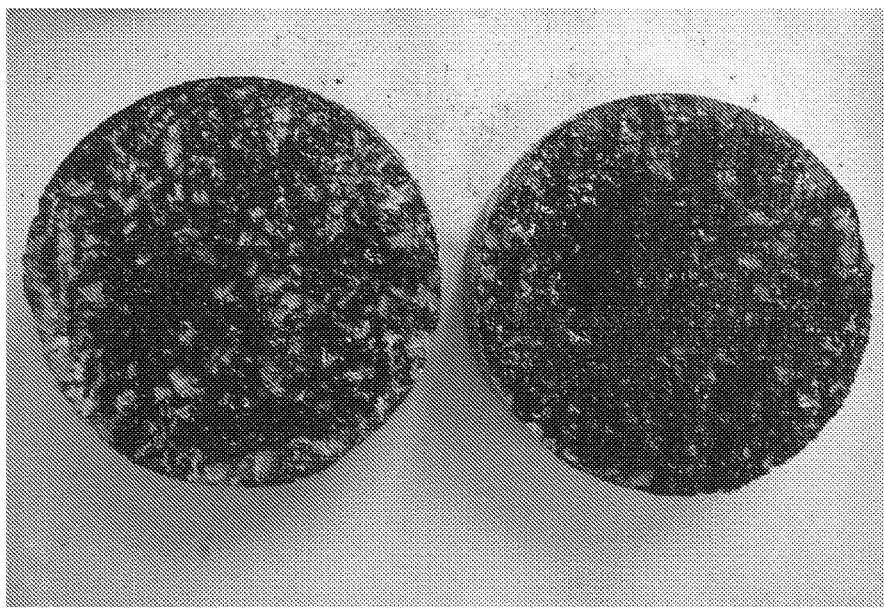
FIG. 3 0.08 (left) and 0.13 (right) gallon / square yard Application Rates – Milled Substrate Samples

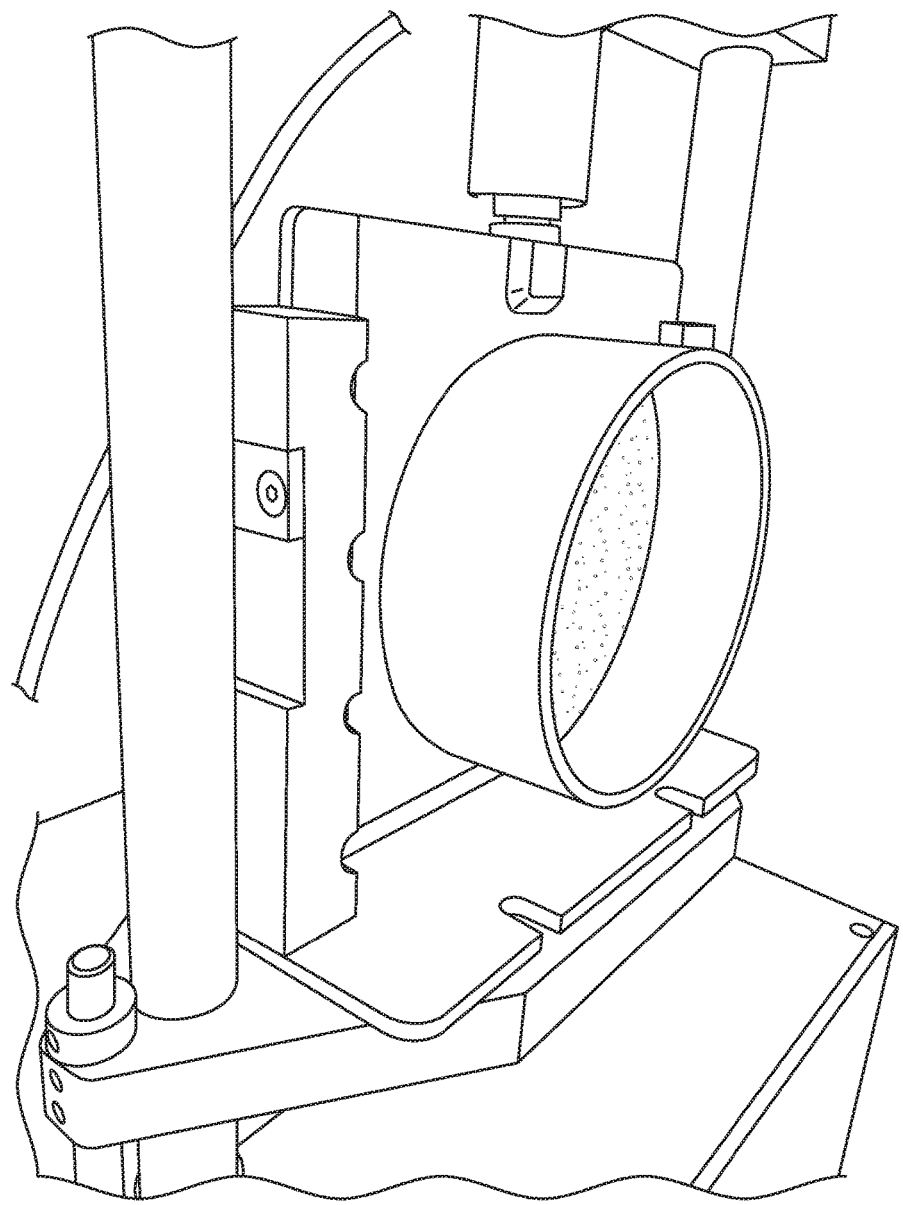
FIG. 4  Tack Coat Bond Strength Breaking Head

FIG. 5 Tack Bond Strength Samples After Testing
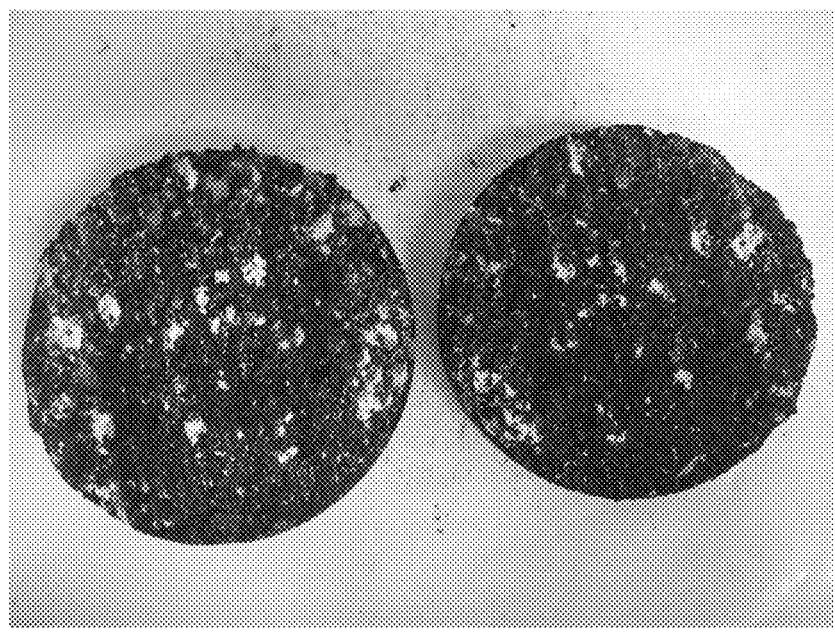
FIG. 6 Tack Coat Interface After Testing – Milled Substrate

ASPHALT COMPOSITIONS, ASPHALT PRODUCTS MADE FROM SUCH ASPHALT COMPOSITIONS, AND THE METHODS OF MAKING AND USING SUCH COMPOSITIONS AND PRODUCTS

BACKGROUND OF THE INVENTION

1. Field of the Invention

The present invention relates to asphalt compositions, to asphalt products made from such asphalt compositions, and to methods of making and using such compositions and products. In another aspect, the present invention relates to asphalt compositions which may be readily applied to surfaces using common equipment and techniques, to asphalt surfaces formed therefrom, and to methods of making and using such compositions and surfaces. In even another aspect, the present invention relates to asphalt compositions using for making thin and ultrathin paving layers, and to method for making and using such compositions and layers. In still another aspect, the present invention relates to asphalt compositions useful in making a non-tracking, hot applied tack coat for bonding two layers of hot mix asphalt together, to non-tracking, hot applied tack coats, to multiple layer surfaces in which the top coat is a non-tracking, hot applied tack coat, and to methods of making and using the foregoing. In yet another aspect, the present invention relates to asphalt compositions comprising a high Pen (i.e., flexible) asphalt, and to products made therefrom, and to methods of making and using such compositions and products. In even still another aspect, the present invention relates to asphalt compositions comprising a lower rotational viscosity asphalt (especially in combination with maintaining a higher softening point), and to products made therefrom, and to methods of making and using such compositions and products. In even yet another aspect, the present invention relates to asphalt compositions comprising a more ductile asphalt to provide products made therefrom some capability of stretching or movement under traffic loading or weather related expansion and contraction, and to products made therefrom, and to methods of making and using such compositions and products. In still even another aspect, the present invention relates to asphalt compositions comprising an asphalt having a sufficient elastic recovery to allow products made therefrom to recover after traffic load had passed or weather related fatigue, and to products made therefrom, and to methods of making and using such compositions and products. In still yet another aspect, the present invention relates to asphalt compositions comprising an asphalt having a lower bond strength, to provide some flexibility to products made therefrom and allow then to move/give way under traffic loading and temperature sweeps (warm to cold e.g., summer/winter and cold front weather), and to products made therefrom, and to methods of making and using such compositions and products.

2. Description of the Related Art

U.S. Pat. No. 5,069,578, issued Dec. 31, 1991, to Bense et al., discloses a Bonded Friction Course ("BFC") road asphalt system, known as the NOVACHIP process which utilizes a specialized "Spray Paver" machine to apply a thick layer of polymer modified tack coat immediately before a thin gap-graded Hot Melt Adhesive ("HMA") asphalt layer is applied. This polymer modified tack coat wicks into the new gap graded mix by displacement and water vaporization. The tack coat provides a degree of adhesion or bonding between the layers and also acts to reduce slippage and sliding of the layers relative to other layers in the pavement structure during use or due to wear and weathering of the pavement structure. The thick application of the tack coat further seals minor cracks in the existing surface layer and forms a strong bond between the new HMA layer and the existing pavement.

Unfortunately, the NOVACHIP bonded friction course system can be prohibitively expensive due to the requirement that the specialized "Spray Paver" machine be used. In the 2011, each spray paver machine was reported to cost almost $500,000, and many paving contractors and state and county transportation agencies cannot justify the expense. However, without the use of the NOVACHIP Spray Paver, the thick layer of emulsified polymer modified tack coat used in a bonded friction course system would be very difficult to work with. The thick layer of emulsion tack coat would have a very slow cure rate, resulting in unacceptable delays and also tracking of the tack coat layer. Tracking occurs when the tack or bonding coat is picked up on the tires or tracks of vehicles traveling over the coated surface. Where this occurs, the asphalt compositions often are tracked onto other pavement surfaces causing disruption to the surrounding area. This tracking also reduces the effectiveness of the tack coat by displacing a portion of the intended volume from the area awaiting a new pavement layer.

Insufficient adhesion between a new layer of pavement and an existing base course, a previously laid pavement layer, or a prepared pavement surface can cause pavement separation and cracking during construction of the structure, as well as subsequent failures and premature deterioration of the pavement structure and/or surface. Such conditions often require costly repairs, can cause damage to vehicles traveling on the surface and may cause dangerous traffic conditions threatening damage to property and injury to vehicles and passengers.

To overcome the need for the specialized NOVACHIP "Spray Paver" machine, U.S. Patent Publication No. 20110206455, published Aug. 25, 2011, by Blacklidge, discloses a method of applying building a pavement structure using a polymer modified hot-applied tack coat that is applied with conventional asphalt distributors without the need for any specialized machinery. This polymer modified tack coat is non-adhesive at ambient temperatures, and, thus, also non tracking. The tack is applied while hot, but cools quickly. The subsequent application of hot mix asphalt results in a superior bond between the asphalt layer and the tack layer. It is particularly well suited to bonded friction course applications since it removes the necessity of specialized spray paving machinery and allows the use of conventional asphalt distributors and pavers.

Other asphalt related art includes the following patents and publications.

U.S. Pat. No. 4,198,177, issued Apr. 15, 1980, to Ray, Jr., et al., discloses methods and apparatus for repair of asphalt surfaces. The invention provides an improvement for those systems for repairing asphalt surfaces that include an emulsion tank, air pressure source, emulsion heating source, pneumatic tools and a vehicle having a fluid cooled engine and a utility body for containing asphalt repairing material. Specifically, the improvement disclosed is an emulsion tank removably mounted on said vehicle for containing a water soluable, air cured, sealer-bonding agent, an air compressor mounted on and driven by said vehicle engine, an air storage tank removably mounted on said vehicle and coupled to said compressor and pressurized thereby, means for selectively coupling air from said pressurized tank to said pneumatic tools and said emulsion tank and means coupling said vehicle cooling fluid to said emulsion tank for heating said emulsion to a usable temperature whereby certain of said pneumatic tools may be selectively driven by said compressed air in said storage tank to trim a damaged asphalt surface, spray emulsion over said trimmed are under pressure from said compressed air tank, and compact said asphalt repairing material into said trimmed and sealed area thereby repairing said damaged asphalt area.

U.S. Pat. No. 4,762,565, issued Aug. 9, 1988, to Graf, discloses an open-graded asphalt paving composition comprising about 80 to 97% by weight of an open-graded aggregate and about 3 to 20% asphalt, said composition being formed by successively mixing two asphalt-containing emulsions A and B with said aggregate wherein: emulsion A comprises about 40 to 75% by weight of a soft asphalt having a viscosity in the range of 50 to 1000 centistokes at 210° F. and 0.25 to 5% by weight of a emulsifier, and water as a continuous phase of said emulsion to make up 100% by weight; and emulsion B comprises about 40 to 75% by weight of a hard asphalt having a penetration 5 to 25 dmm at 77° F. and 0.25 to 5% by weight of a emulsifier, and water as a continuous phase of said emulsion to make up 100% by weight.

U.S. Pat. No. 4,836,857, issued Jun. 6, 1989, to Hopkins discloses asphalt additive compositions which comprise (A) a metallic organic strength improving compound and (B) an anti-strip compound. The metal of said metallic organic compound is selected from the group consisting of manganese, cobalt, copper, vanadium, molybdenum, cerium, iron, nickel, lead, zirconium, barium, calcium and zinc. The preferred metal is manganese. The anti-strip compound is designed to reduce water-induced damage to asphalt paving mixtures.

U.S. Pat. No. 5,735,634, issued Apr. 7, 1998 to Ulrich et al., discloses a road finisher, which is used for simultaneously applying at least two surface layers comprises a chassis, a travelling mechanism, at least two premix containers arranged on said chassis, a lateral distributor associated with the respective premix container and adapted to have material supplied thereto via a conveyor path extending in the chassis, and lateral outriggers attached to the chassis as well as a dragged road-surface applying device used for applying a surface layer and arranged on said outriggers, all road-surface applying devices being high-compaction road-surface applying screeds for recompaction-free application of a surface layer, and each high-compaction road-surface applying screed constituting a rear screed, when seen in the direction of movement, which is constructed as a high-compaction road-surface applying screed which is adapted to be used for applying and compacting concrete. In the method of applying surface layers by use of such a road finisher, the surface layers are applied one immediately after the other and in one operation in such a way that each first surface layer is highly compacted during application to such a degree that recompaction is no longer necessary and each following surface layer is applied to the highly-compacted surface layer and then, in turn, highly compacted to such a degree that recompaction is no longer necessary.

U.S. Pat. No. 5,769,567, issued Jun. 23, 1998 to Durand et al., discloses a process and a machine for forming a bonding layer for bonding a bituminous coated material layer on a support. The process includes application of a surface-active agent on the support, application of a bituminous emulsion on the surface-active agent on the support, and application of a breaking agent on the bituminous emulsion to form the bonding layer. A road-type coating made by the process and, therefore, including such a support layer, a bonding layer on the support, and a bituminous coated materials layer on the bonding layer. To perform the process, a machine includes a frame, a displacement mechanism on the frame, a bituminous-emulsion spreader on the frame, a surface-active agent applicator on the frame, and a breaking agent applicator on the frame.

U.S. Pat. No. 6,444,258, issued Sep. 3, 2002 to Terry, discloses a method and apparatus of treating a pavement surface, including the steps of: applying a layer of bituminous sealant at a predetermined temperature and application rate on the pavement surface; applying a layer of bituminous emulsion at a predetermined temperature and application rate on the first of bituminous sealant, wherein a thermal reaction occurs between the bituminous sealant and the bituminous emulsion so as to accelerate a material break and cure time for said layers; and, providing a layer of aggregate particles at a predetermined application rate on the layers of bituminous sealant and bituminous emulsion during the thermal reaction. The steps of the method are performed successively along a particular direction of advance at a rate which permits them to be accomplished within a predetermined time period. Additional steps of compacting the layers and/or applying an asphalt layer thereon may also be performed.

U.S. Patent Publication No. 20070141241, published Jun. 21, 2007 by Blacklidge, a method for bonding together an existing substrate layer and a pavement layer, such that a strong adhesive bond is formed by using a tack coat, provided by an asphalt emulsion, in between the layers as the bond coat. The tack coat layer is a low-tracking coating which cures quickly such that the pavement layer may be applied to the substrate, hours to days after the emulsion is applied to the substrate. The asphalt emulsion comprises at least a first phase of from about 30% to about 70% of an asphalt composition, about 30% to about 70% water, and about 0.1% to about 3.0% emulsifying agent, stabilizer and/or additives, or 0.1% to about 30% if polymeric or other additives are also included.

U.S. Pat. No. 7,503,724, issued Mar. 17, 2009 to Blacklidge, discloses a method for bonding together an existing substrate layer and a pavement layer, such that a strong adhesive bond is formed by using a tack coat, provided by an asphalt emulsion, in between the layers as the bond coat. The tack coat layer is a low-tracking coating which cures quickly such that the pavement layer may be applied to the substrate, hours to days after the emulsion is applied to the substrate. The asphalt emulsion comprises at least a first phase of from about 30% to about 70% of an asphalt composition, about 30% to about 70% water, and about 0.1% to about 3.0% emulsifying agent, stabilizer and/or additives, or 0.1% to about 30% if polymeric or other additives are also included.

U.S. Patent Publication No. 20090169901, published Jul. 2, 2009, by Blacklidge, discloses a method for bonding together an existing substrate layer and a pavement layer, such that a strong adhesive bond is formed by using a tack coat, provided by an asphalt emulsion, in between the layers as the bond coat. The tack coat layer is a low-tracking coating which cures quickly such that the pavement layer may be applied to the substrate, hours to days after the emulsion is applied to the substrate. The asphalt emulsion comprises at least a first phase of from about 30% to about 70% of an asphalt composition, about 30% to about 70% water, and about 0.1% to about 3.0% emulsifying agent, stabilizer and/or additives, or 0.1% to about 30% if polymeric or other additives are also included.

U.S. Patent Publication No. 20090182074, published Jul. 16, 2009 by Scholten, discloses an asphalt binder comprising 85 to 97.5 parts by weight of a bitumen and 16 to 2.5 parts by weigh of a polymer composition, wherein the polymer composition comprises: (i) from 2 to 8, preferably from 3 to 6 parts by weight of a styrenic block copolymer having at least two blocks of monovinylaromatic hydrocarbon (A) and at least one block of a conjugated diene (B), wherein the block copolymer composition has a vinyl content of at least 25% by weight, preferably from 25 to 40% by weight, based on the total diene content; (ii) from 0 to 5, preferably from 1 to 3 parts by weight of a styrenic diblock copolymer having one block of monovinylaromatic hydrocarbon (A) and one block of a conjugated diene (B); and (iii) from 0.5 to 3, preferably from 1 to 2.5 parts by weight of an ethylene-vinyl acetate copolymer, wherein the weight ratio of (i)+(ii):(iii) is from 2:1 to 6:1, preferably from 3:1 to 4:1. In addition, an asphalt mix is provided comprising 2 to 8 parts by weight of the asphalt binder of the present invention and 98 to 92 parts by weight of gap-graded aggregate or open-graded aggregate material. Furthermore, a porous pavement is claimed, produced from the open or gap-graded mixes, by compacting the asphalt mix mentioned above.

U.S. Patent Publication No. 20130154985, published Jun. 6, 2013, by Blacklidge et al., discloses a method of making an asphalt composition containing large quantities of ground tire rubber. Over 20% GTR by weight can be used in the asphalt composition without the GTR settling out. The method comprises a series of heating and blending and using a GTR stabilizer.

U.S. Pat. No. 8,840,717, issued Sep. 23, 2014, to Naidoo et al., discloses an additive package for warm-mix asphalt formulations for the pavement of road surfaces, said additive package comprising a) surfactant component, and b) an asphalt rheology modifying component, wherein said asphalt rheology modifying component comprises at least one of a i) a wax component and ii) a resin component. The invention also relates to a warm mix asphalt having improved compaction at lower temperatures, and to a pavement made from said warm mix asphalt.

Referring back to the asphalt compositions, products and methods of the '455 Publication, they utilize low Pen value (i.e. stiffer) asphalts, and these stiffer asphalts when utilized in trackless-type tacks, may perform poorly in thin pavements. Such hard Pen binders are becoming increasingly difficult to source and further, they are very variable in quality from refinery to refinery as well as crude oil source variations. Further, while asphalts of the '455 Publication are far more sprayable than the prior art NOVACHIP asphalts, there is still room for improvement in the sprayability of the '455 Publication asphalts that can be affected by having a lower rotational viscosity asphalt. Even further, the asphalts of the '455 Publication (as tested in the Example section below) have ductility of zero, meaning absolutely no capability of stretching or movement under traffic loading or weather related expansion and contraction. Still further, the asphalts of the '455 Publication (as tested in the Example section below) have an elastic recovery of zero, meaning will absolutely not allow the Tack Coat to recover after traffic load had passed or weather related fatigue. Finally, the asphalts of the '455 Publication has high bond strengths. Interestingly, the higher bond strength is not necessarily better since as the bond becomes too rigid and will not move/give way under traffic loading and temperature sweeps (warm to cold eg summer/winter and cold front weather).

Therefore the asphalts of the '455 Publication also have room for improvement with a lower bond strength to provide/allow more movement.

Thus, in spite of the advances in the prior art, there is still a need in the art for improved asphalt compositions, improved asphalt products, and methods of making and using such compositions and products.

Thus, there is a need in the art for asphalt compositions comprising a high Pen (i.e., flexible) asphalt, and to products made therefrom, and to methods of making and using such compositions and products.

There is another need in the art for asphalt compositions comprising a lower rotational viscosity asphalt (especially in combination with maintaining a higher softening point), and to products made therefrom, and to methods of making and using such compositions and products.

There is even another need in the art for asphalt compositions comprising a more ductile asphalt to provide products made therefrom some capability of stretching or movement under traffic loading or weather related expansion and contraction, and to products made therefrom, and to methods of making and using such compositions and products.

There is still another need in the art for asphalt compositions comprising an asphalt having a sufficient elastic recovery to allow products made therefrom to recover after traffic load had passed or weather related fatigue, and to products made therefrom, and to methods of making and using such compositions and products.

There is yet another need in the art for asphalt compositions comprising an asphalt having a lower bond strength, to provide some flexibility to products made therefrom and allow then to move/give way under traffic loading and temperature sweeps (warm to cold e.g., summer/winter and cold front weather), and to products made therefrom, and to methods of making and using such compositions and products.

These and other needs in the art will become apparent to those of skill in the art upon review of this specification, including its drawings and claims.

SUMMARY OF THE INVENTION

It is an object of the present invention to provide for improved asphalt compositions, improved asphalt products, and methods of making and using such compositions and products.

It is another object of the present invention to provide for asphalt compositions comprising a high Pen (i.e., flexible) asphalt, and to products made therefrom, and to methods of making and using such compositions and products.

It is even another object of the present invention to provide for asphalt compositions comprising a lower rotational viscosity asphalt (especially in combination with maintaining a higher softening point), and to products made therefrom, and to methods of making and using such compositions and products.

It is still another object of the present invention to provide for asphalt compositions comprising a more ductile asphalt to provide products made therefrom some capability of stretching or movement under traffic loading or weather related expansion and contraction, and to products made therefrom, and to methods of making and using such compositions and products.

It is yet another object of the present invention to provide for asphalt compositions comprising an asphalt having a sufficient elastic recovery to allow products made therefrom to recover after traffic load had passed or weather related fatigue, and to products made therefrom, and to methods of making and using such compositions and products.

It is even still another object of the present invention to provide for asphalt compositions comprising an asphalt having a lower bond strength, to provide some flexibility to products made therefrom and allow then to move/give way under traffic loading and temperature sweeps (warm to cold e.g., summer/winter and cold front weather), and to products made therefrom, and to methods of making and using such compositions and products.

These and other objects will become apparent to those of skill in the art upon review of this specification, including its drawings and claims.

According to one embodiment of the present invention, there is provided a paving composition comprising an aminated wax and an asphalt cement with a pen value greater than 50 dmm at 25° C.

According to another embodiment of the present invention, there is provided a paving composition comprising an aminated wax and an asphalt cement.

According to even another embodiment of the present invention, there is provided a pavement structure comprising: a substrate pavement layer; and a tack coat applied to the substrate pavement layer, wherein the tack coat comprises an asphalt cement with a pen value greater than 50 dmm at 25° C.

According to still another embodiment of the present invention, there is provided a pavement structure comprising: a substrate pavement layer; and, a tack coat applied to the substrate pavement layer, wherein the tack coat comprises an aminated wax and an asphalt cement with a pen value greater than 50 dmm at 25° C.

According to yet another embodiment of the present invention, there is provided a pavement structure comprising: a substrate pavement layer; and, a tack coat applied to the substrate pavement layer, wherein the tack coat comprises an asphalt cement and an aminated wax.

According to even still another embodiment of the present invention, there is provided a method of forming a pavement structure. The method includes at least applying a tack coat to a substrate pavement layer, wherein the tack coat comprises an asphalt cement with a pen value greater than 50 dmm at 25° C.

According to even yet another embodiment of the present invention, there is provided a method of forming a pavement structure. The method includes at least applying a tack coat applied to a substrate pavement layer, wherein the tack coat comprises an aminated wax and an asphalt cement with a pen value greater than 50 dmm at 25° C.

According to yet even another embodiment of the present invention, there is provided a method of forming a pavement structure. The method includes at least applying a tack coat to a substrate pavement layer, wherein the tack coat comprises an asphalt cement and an aminated wax.

Various sub-embodiments of any of the above embodiments further include: wherein the rejuvenator comprises tall oil; compositions and/or tack coat further comprising a polymeric component; wherein the aminated wax is plant oil derived; wherein the tack coat comprises a softening point of 135° C. or higher; wherein the tack coat comprises a rotational viscosity at 150° C. of less than 600 cps; wherein the tack coat comprises a rotational viscosity at 160° C. of less than 400 cps; wherein the tack coat comprises ductility values at 25° C. of greater than 1 cm; wherein the tack coat comprises elastic recovery values at 25° C. of greater than 1%; wherein the tack coat comprises a bond strength in the range of about 100 psi to about 300 psi; wherein the tack coat further comprises an aminated wax derived from castor oil; further comprising an asphalt layer applied to the tack coat; and/or further comprising allowing the tack layer to cool and applying an asphalt layer to the tack coat, the asphalt layer heated to a temperature sufficient to increase the adhesive properties of the tack coat. It should be understood that any of the further details as described herein may be included in any of the embodiments of the invention.

These and other embodiments of the present invention will become apparent to those of skill in the art upon review of this specification, including its drawings and claims.

BRIEF DESCRIPTION OF THE DRAWINGS

FIG. 1 is a picture showing for example 1, Milled (right) and Unmilled (left) Substrate Samples.

FIG. 2 is a picture showing for example 1, substrate samples at 0.08 gallon/square yard application rate for example 1.

FIG. 3 is a picture showing for example 1, 0.08 (left) and 0.13 (right) gallon/square yard application rates—for milled substrate samples.

FIG. 4 is a picture showing for example 1, tack coat bond strength breaking head FIG. 5 is a picture showing for example 1, tack bond strength samples after testing.

FIG. 6 is a picture showing for example 1, tack coat interface after testing—milled substrate.

DETAILED DESCRIPTION OF THE INVENTION

The present invention provides for asphalt compositions, provides for asphalt products made therefrom, and provides for methods for making and using such compositions and products. Products of the present invention include tack coats, and multiple layer pavement structures made therefrom. Tack coats are thin layers of asphalt product that are used in the construction or refacing of roads and highways. This type of product is used to help the layers of asphalt laid down as part of the road building process to bond together with more efficiency. As a result, the highway or road is able to hold up under constant use for longer periods of time, making it easier to maintain the road properly.

Some non-limiting embodiments of the present invention provides asphalt compositions useful for creating a bonded friction course pavement structure that does not require the use of specialized machinery for its application. Specifically, the present invention may employ conventional asphalt distributors (i.e., tank trucks having a spray bar as a non-limiting example), to place a hot-applied, tack coat having the property after cooling of being non-adhesive at ambient temperatures. The present invention tack coat layer is applied while hot, at temperatures greater than 212° F. in a liquid form, and may be allowed to cool to ambient temperatures. At ambient temperatures, the tack coat is non-tracking and non-adhesive. However, when it comes into contact with a new hot mix asphalt layer, the tack coat becomes adhesive, again. Thus, the present invention provides resulting pavement structures with improved strength compared to other known paving systems.

As used herein, "ambient temperature" is any temperature that is typically used in paving applications, with temperatures generally set by governmental regulations/specification, or in the case of private parties by contract there between. Very commonly, paving is typically only performed at temperatures greater than about 40° F., 50° F. or 60° F. As for an upper limit, "ambient temperature" will typically be less than 120° F., 130° F. or 140° F. Thus, ranges for "ambient temperatures" will generally be in the range of greater than about 40° F., 50° F. or 60° F. ranging up to about 120° F., 130° F. or 140° F.

Some non-limiting embodiments of present invention provide (i) modified asphalt compositions that comprise asphalt and an aminated wax, or (ii) comprise asphalt having a pen value greater than 50 dmm, or (iii) comprise asphalt and aminated wax with the asphalt having a pen value greater than 50 dmm (pen values throughout are at 25° C. unless otherwise indicated). All of these embodiments may further include a rejuvenator, and/or a elastomeric polymer.

For the asphalt compositions of the present invention, the Needle Pen value is an important property that determines the hardness of the tack coat upon spray out onto the surface substrate and which spray out should not be too soft (defeat Trackless property) nor should it be too hard (to cause embrittlement and cracking under weather and traffic load related fatigue).

In the practice of some embodiments of the present invention, generally any suitable asphalt may be modified with the aminated wax regardless of the pen value of the asphalt.

Other embodiments will be limited to asphalts having a certain pen value that allow the asphalt to wet the surface substrate and bond with the old pavement and new layer paved over it. If the Pen is too low (hard) there will be no wetting and bonding (too dry) in addition to lack of flexibility. As non-limiting examples, suitable asphalts include those with pen values greater than 50, 51, 52, 53, 54, 55, 56, 57, 58, 59, 60, 65, 70, 75, 80, 90 or 100 dmm. Suitable ranges of pen values for such asphalts will generally range between any two of 50, 51, 52, 53, 54, 55, 56, 57, 58, 59, 60, 65, 70, 75, 80, 90 or 100 dmm. Additional suitable ranges of pen values for such asphalts will generally range to/from any two of 50.01, 51, 52, 53, 54, 55, 56, 57, 58, 59, 60, 65, 70, 75, 80, 90 or 100 dmm. Non-limiting examples of suitable ranges includes pen values between 50 and 80, 90 or 100 dmm, or greater than 50 and up to 80, 90 or 100 dmm. Other non-limiting examples of suitable ranges include from 50, 51, 52, 53, 54, 55, 56, 57, 58, 59, or 60 to 65, 70, 75, 80, 90 or 100 dmm. Still other non-limiting examples includes pen values from 55 to 80 dmm.

While the invention is not so limited to this asphalt, a commercially available grade suitable for use in the present invention includes Pen Grade 60/70 asphalt that has a Pen value in the range of 60 to 70 as the grade name describes.

Certain embodiments of the present invention provide for asphalt compositions modified with one or more aminated waxes having a softening point of at least 125° C. and above. As non-limiting examples, suitable aminated waxes may have a softening point of at least 125° C., 130° C., 135° C., 140° C., 145° C., 150° C., 160° C., or 170° C. Suitable aminated waxes may have a softening point in the range of between or to/from any two of the following 125° C., 130° C., 135° C., 140° C., 145° C., 150° C., 155° C., 160° C., 165° C., or 170° C.

Suitable aminated waxes useful in the present invention will obviously have an amine functionality so that it interacts with the asphalt binder and surfaces it is intended to bond (i.e., the old and new layer). These useful aminated waxes have certain special performance characteristics, and may impart any or all of the following upon an asphalt. First, a suitable wax may be an active material interacting with the old and new aggregate. Second, a suitable wax may make the asphalt binder more ductile, that is, for example, it may increase the ductility at 25 C from 55 cm or so to over 80 cm and even over 100 cm. In the practice of the present invention, this ductility increase is important as it will allow for a shift between the old and new layers under traffic load and with differential contraction of the pavement layers with temperature (summer/winter). Third, a suitable wax may lower the viscosity of the asphalt binder so that spray out will be easy and controllable within fine limits. Without being limited by theory, applicant believes this is accomplished by lowering the surface tension of the asphalt binder. Fourth, a suitable wax makes the asphalt have a high set point, ie. it is liquid (sprayable) at 150 C or higher but will be solid at 140 C/284 F making it "Quick Set" for driving upon to pave the new layer without sticking to the paver wheels. Fifth, a suitable wax may raise the softening point of the binder to above 250° F. Sixth, a suitable wax allows for the asphalt composition to be easily produced in any mixing apparatus without the need for high shear equipment.

As is well known, waxes include synthetic waxes, petroleum waxes, and those derived from any number of plants and animals, and such waxes may find utility in the present invention. Generally, waxes suitable for use in the present invention are the ones with longer carbon chains and that have a sufficient ester functionality. Vegetable oils are especially useful for making aminated waxes suitable for the present invention. As non-limiting examples, aminated waxes derived from linseed oils, castor oils, rapeseed oils, soy oils, jetropha oils, just to name a few, are useful in the present invention. Generally the oils will first be hydrogenated and then aminated. As a non-limiting example, castor oil may be first deeply hydrogenated to a melt point of 85 C to 90 C and then aminated to melt point of 125 C to 160 F (preferably 135 C to 145 C). A non-limiting commercially available examples of such an aminated castor oil wax is EcoGreen SPA, marketed by Shamrock M.E.D. LLC and which has a melt point in the range of 135° C. to 145° C., Iodine Value of 4 max and an acid value of 5 mg KOH/g an with an average molecular weight of 1030.

Various non-limiting embodiments of the present invention provide a non-tracking, polymer modified tack coat that is non-adhesive at ambient temperatures that may be applied utilizing conventional asphalt distributors (i.e., tank trucks having a spray bar as a non-limiting example). In the practice of the present invention, the hot-applied tack coat is heated until it is liquid and sprayable and, then, sprayed on the pavement to create the thick layer. Typically this tack coat is applied at the rate of 0.04 to 0.8 gals/yd$^2$ for a conventional HMA overlay, or 0.09 to 0.18 gals/yd$^2$ for a Bonded Friction Course. Once applied, the layer of tack coat cures hard to the touch in seconds to form a non-tracking surface. Cracks that may exist in existing pavement are filled by this thick layer, thus sealing the surface. A hot-mix asphalt layer can, then, be placed over the tack coat layer almost instantly after the tack coat layer has cooled. Formulation methods and application methods as taught and described in US Patent Publication No. 2011/0206455 may be utilized in the practice of the present invention, and that publication is herein incorporated by reference for all that it teaches.

As the tack coat of the present invention cools, it becomes non-adhesive, and, therefore, non-tracking. Vehicles can drive over this layer without fear of the tack coat sticking to the tires of the vehicles. When the hot-mix asphalt layer is applied on top of the tack coat, the heat of the HMA layer causes the tack coat to liquefy, and this liquefied membrane is wicked into the HMA layer by displacement. At the higher temperatures of the hot mix layer, the tack coat is extremely adhesive, allowing it to form a strong structural bond with the OGFC or other hot mix asphalt layer. As the tack coat of the present invention cools, the bond with the hot mix asphalt layer becomes stronger. However, the tack coat of the present invention retains its flexibility.

It should be appreciated that the present invention trackless tack coat is particularly useful in Open Graded Friction Course, Bonded Friction Course, and thin overlay mixes where the material was previously applied with specialized distributors, such as "Spray Pavers." However, using the claimed method only a conventional distributor and paver are required. As a result, the methods disclosed are available to all contractors and government agencies that do not want to purchase a proprietary or specialized machine.

The disclosed method may use any tack coat formulation that has the desired properties of being adhesive only at higher temperatures, but not at ambient temperatures. The tack coat can be made by blending a high Pen value asphalt (i.e., pen value greater than 50) and/or with aminated wax and/or other additives as discussed above.

Some embodiments of the asphalt compositions of the present invention are further modified with a rejuvenator that functions to maintain the binder rejuvenation and bond strength during life of pavement. The rejuvenator utilized in the present invention is generally a tall oil product such as any of those disclosed in U.S. Pat. No. 8,608,845, which patent is hereby incorporated by reference. This rejuvenator serves to rejuvenate the old pavement and activate the aged binder it contains to bond with the membrane layer sprayed, and also to continue the rejuvenation process and bonding between the old pavement and membrane layer and the new pavement and the membrane layer. This process will be ongoing during the life of the pavement to give ongoing good adhesion. The rejuvenator will also provide ongoing Low Temperature Flexibility as the pavement ages. Any similar rejuvenator that is used in the rejuvenation of aged Reworked Asphalt Pavement (RAP) and/or Reworked Asphalt Shingles (RAS) may also be embodied in this invention as non-limiting Rejuvenators. The function of the Rejuvenator is to disperse the asphaltenes so formed with aging of the asphalt binder and to keep the reformation of such asphaltenes in check.

A commercially available non-limiting example of a suitable rejuvenator is Hydrogreen S rejuvenator, a reacted mixture of Tall Oil and selected vegetable oils. commercially produced and marketed in the USA by PVS (Meridian) Inc., under U.S. Pat. No. 8,608,845.

For the following descriptions of the possible weight percent content of the asphalt compositions, it should be understood that after accounting for all of the possible additives, the balance of the asphalt composition will be asphalt as described herein. Generally, the asphalt component will comprise at least 60, 70, 80, 90, 95 or more weight percent of the composition, based on the total weight of the composition.

Asphalt compositions of the present invention may include aminated wax(es), that when present will comprise in the range of between or to/from any two of the following 1, 2, 3, 4, 5, 6, 7, 8, 9, 10, 15 or 20 percent by weight of the total composition. As non-limiting examples, suitable ranges include 2% to 10% and 4% to 8% (weight percent based on total weight of composition). The aminated wax generally provides Softening Point enhancement as well as wetting out of the surface substrate and active bonding with the substrate.

Asphalt compositions of the present invention may include tall oil composition rejuvenators, that when present will comprise in the range of between or to/from any two of the following 0.5, 1, 2, 3, 4, 5, 6, 7, 8, 9, or 10 percent by weight of the total composition. As non-limiting examples, suitable ranges include 0.5% to 5% and 2% to 3% (weight percent based on total weight of composition). The rejuvenator generally provides effective rejuvenation and substrate wetting out.

Asphalt compositions of the present invention may include elastomeric polymer(s), that when present will comprise in the range of between or to/from any two of the following 0.5, 1, 2, 3, 4, 5, 6, 7, 8, 9, or 10 percent by weight of the total composition. As non-limiting examples, suitable ranges include 0.5% to 4% and 1% to 2.5% (weight percent based on total weight of composition). The elastomeric polymer generally provides for required flexibility. Non-limiting examples of suitable elastomeric polymers are styrene butadiene styrene (SBS), styrene butadiene rubber (SBR), terpolymers, acrylic polymers, ethyl vinyl acetate, natural rubber or any polymer that imparts flexibility to the tack coat in cold climate conditions and under repeated traffic loading stresses.

For the asphalt compositions of the present invention, rotational viscosity is important for accurate and consistent spray out and even and consistent coverage of the surface substrate without plugging of the spray nozzles and without stringing out upon rapid cooling upon emitting from the spray nozzles. Generally, the desirable rotational viscosity in summer conditions (spray out temperature of 150° C./302° F.) is in the range of between or to/from any two of the following 90, 100, 110, 125, 150, 175, 200, 225, 250, 275, 300, 400, 500 and 600 cps. As non-limiting examples, for a spray out temperature of 150° C./302° F., a rotational viscosity in the range of 110 cps to 300 cps or in the range of 125 cps to 250 cps. In cooler Spring and Fall climates (spray out temperature of 160° C./320° F.) the desirable rotational viscosity range is in the range of between or to/from any two of the following 80, 90, 100, 110, 120, 130, 150, 170, 190, 200, 250, 300, 350 and 400 cps. As non-limiting examples, for a spray out temperature of 160° C./320° F., a rotational viscosity in the range of 80 cps to 200 cps or in the range of 90 cps to 190 cps.

For the asphalt compositions of the present invention, Softening Point is an important property that controls the set point (ie transition from molten state to solid state) of the Tack Coat on the surface substrate. Therefore a high softening point is desirable in the range of between or to/from any two of the following 200° F., 210° F., 220° F., 230° F., 240° F., 250° F., 260° F., 270° F., 280° F., 290° F., or 300° F. As non-limiting examples, softening points in the range of about 220° F./104° C. to 280° F./138° C. or in the range of 250° F./121° C. to 270° F./132° C.

For the asphalt compositions of the present invention, Bond Strength of any formed tack coat is an important property, and the Bond Strength should not be so high as to render the composition "glassy" and susceptible to cracking. High Bond strength, up to a point is good for adhesion over the life of the pavement and endured traffic load and temperature fatigue cycles. However, a degree of flexibility in the bond is essential to permit some pliability and movement under such pavement fatigue stresses and strains described above. If such flexibility is not present the Tack Coat bond will crack and the integrity of the pavement will be compromised and it will fail prematurely. Therefore extremely high Bond Strengths such as that exhibited by some commercial products being too brittle will crack and work against the concept of bonding and rather cause pavement failure. Therefore in the practice of the present invention, there needs to be a good balance between bonding and flexibility as can be provided by the asphalts of the present invention. Thus, some embodiments of the present invention provide asphalt compositions in which the resultant tack coat (for thin and ultrathin pavement overlays) will have a bond strength that will not exceed 300 psi as a safety margin against such cracking potential. Certainly, the bond strength will meet common minimum bond strengths (generally 100 psi).

For the asphalt compositions of the present invention, ductility is an important property, and is a measure of how the Tack Coat will stretch or become ductile to give way under repeated traffic loading and/or when the pavement expands and contracts with changing ambient temperatures (ie. summer, winter, temperature sweeps and, cold fronts approaching). The asphalts of the present invention provide superior tack coats that are very ductile and have a great measure of "give" under repeated traffic loading and unloading on the pavement as well as with weather related expansion and contraction. Products of the present invention will have ductility values at 25° C. of greater than 0, 5, 10, 15, 20, 25, 30, 35, 40, 45, 50, 55, 60, 65, 70, 75, 80, 85, 90, 95, 100, 110, 125, or 150 cm.

For the asphalt compositions of the present invention, elastic recovery is an important property, and is a measure of how the Tack Coat will stretch and recover after being subjected to repeated traffic loading and unloading. Such recovery is essential for the short and long term integrity of the pavement to prevent pavement cracking. As can be seen from the data in the Examples, Tack Coats made from '455 Publication type asphalt have zero Elastic Recovery and will absolutely not allow the Tack Coat to recover after traffic load had passed or weather related fatigue. To the contrary, tack coats of the asphalt compositions of the present invention has a sufficient level of Elastic Recovery which will allow for the Tack Coat to recover under such conditions. Products of the present invention will have elastic recovery values at 25° C. of greater than 0, 1, 2, 3, 4, 5, 6, 7, 8, 9, 10, 12, 14, 16, 18, 20, 25 or 30%.

In some embodiments of the present invention, there is the combination of the higher softening point for the composition as described above, combined with the low viscosity as described above that provides improvements such as quick setting.

In other embodiments of the present invention, there is the combination of the higher softening point for the composition as described above, combined with the Pen Value as described above.

In generally, conventional wisdom limits the use of trackless tack in cool weather. The compositions of the present invention would appear to buck conventional wisdom and still be useful in cool weather. Additionally, the compositions of the present invention are believed to be suitable for use in thin (i.e., 1-2 inches thick) and ultrathin (i.e., less than 1 inch thick) paving applications.

EXAMPLES

The following non-limiting example are being provided merely to illustrate some non-limiting embodiments of the present invention. They are not intended to and do not limit the scope of the claims.

Example 1

Bond Strength Evaluation of DOT™ C10 and DOT™ C12 Tack Coat

Bond strength testing was conducted for each tack coat sample at two different application rates and substrate conditions. The substrate conditions represented both milled and unmilled surfaces. Three replicates were prepared for each combination, for a total of 24 samples tested.

General Procedure.

A single, 9.5 mm nominal maximum aggregate size (NMAS) Superpave mix developed by Basic Construction Company, LLC, located in Newport News, Va., was used as the surface mix for all samples tested. The mix design contained 35 percent recycled asphalt pavement (RAP), and had an optimum asphalt content of 5.55 percent. For the substrate samples, both milled and unmilled samples were used. The unmilled samples were prepared using a 12.5 mm NMAS Superpave mix designed to meet Alabama Department of Transportation's (ALDOT) 424 Specifications. The optimum asphalt content for the mixture was 4.6 percent. For the DOT™ C10 and DOT™ C12 tack coat samples, application rates of 0.08 and 0.13 gallons/square yard were evaluated. For a six inch gyratory sample and using a density of 8.6 pounds/gallon for the tack coat, this equated to applying 6.8 grams and 11.1 grams to the substrate surfaces, respectively.

For the milled samples, the substrate samples were from milled slab samples of a gravel based asphalt mix that the National Center for Asphalt Technology had extra from a research project and allowed us to obtain and use for this evaluation. Summaries of the job mix formulas used in this evaluation are presented in the Appendix. The job mix formula for the milled samples was not obtained.

For the unmilled substrate samples, a thickness of 63.5 mm was used; this is a typical lift thickness for a 12.5 mm NMAS asphalt mix. For the surface mix, a thickness of 38.1 mm was used for all samples. Therefore, samples were fabricated to a consistent height of 101.6 mm. During fabrication of the test samples, it was noticed that the milled samples had slight differences in thickness; therefore the samples could not be fabricated to a consistent height. It was decided that for the milled surfaces, the surface mix would be compacted using 10 gyrations, which was the average number of gyrations the surface mix needed to reach 101.6 mm for the unmilled samples. This allowed all samples to have approximately the same compaction effort applied to the surface mixture. Examples of the milled (right) and unmilled (left) substrate samples are shown in FIG. 1. FIGS. 2 and 2 show the tacked substrate samples at the 0.08 gallon/square yard application rate (FIG. 2) and the visual difference between the tack coat application rates when applied to the milled substrate samples (FIG. 3).

Tack Coat Bond Strength

Bond strength testing was conducted according to ALDOT 430. The breaking head is pictured in FIG. 4. Measured data from the bond strength testing is presented in Table 1. From the data, several observations could be made. First, both tack coats produced bond strength values well above the recommended ALDOT minimum value of 100 psi. Second, the DOT C12 tack coat produced bond strength values greater than those measured for the DOT C10 tack coat. And third, the unmilled substrate samples had higher bond strength values that the milled substrate samples for each tack coat application rate.

For the milled substrate samples for the DOT C12 tack coat, each sample for the two application rates were tested at a different mill direction orientation. This was done to determine if mill direction had an influence on the measured bond strength. For the 0.08 gallon/square yard application rate, as the orientation angle increased, the measured bond strength increased. For the 0.13 gallon/square yard application rate, this trend was reversed. This may be due to the higher application rate creating a slight slippage plane across the milled grooves, lowering the measured bond strength. FIGS. 5 and 6 illustrate the bond strength samples after testing.

As used herein, Tack Type "Com '455" refers to a commercially available product based on U.S. Patent Publication No. 2011/0206455. Com '455 is a polymer modified asphalt having a pen value less than 50. Because the bond strength data in the '455 Publication was obtained using the University of Louisiana method, it was redone on commercial samples utilizing the Alabama DOT method described above so as to be consistent.

The Com '455 samples will have a much higher bond strength because it is based on Hard Pen asphalt with lower Pen values than the DOT 10 and DOT 12 samples. The higher bond strength is not necessarily better since the bond becomes too rigid and will not move/give way under traffic loading and temperature sweeps (warm to cold eg summer/winter and cold front weather). Therefore the products of the present invention will give more movement and will actually be better. The aminated Wax is also key difference, ie being functionalized wax it has active adhesion points for binder and pavement. Further it reduces the tack coat viscosity making it more penetrating and wetting out the substrate in addition to making the application easier and more controlled without stringing and pasting up.

TABLE 1

COMPOSITIONS OF DOT-C10 AND DOT-C12

| Component | DOT-C10 % wt/wt | DOT-C12 % wt/wt |
|---|---|---|
| Asphalt Binder PG 64-22 | 93.00 | 93.00 |
| Aminated Wax, eg EcoGreen SPA | 6.00 | 5.00 |
| Rejuvenator, eg Hydrogreen | 1.00 | 1.00 |
| Elastomeric Polymer, eg Elvaloy | | 1.00 |
| Total % Composition | 100.00 | 100.00 |

Notes for TABLE 1.
1. The Asphalt Binder PG 64-22 is a straight run asphalt binder with Pen value of 60 and softer (i.e., higher Pen values). No need for hard Pen binder.
2. The Aminated Wax is an aminated vegetable wax (castor oil) with a Softening Point of 250 F. and above.
3. The Hydrogreen Rejuvenator comprises tall oil and keeps formation of asphaltenes in check ie reduces the hardening/cracking propensity of the binder by retarding binder aging to maintain bond strength of the Tack Coat during life of pavement.
4. The Elastomeric Polymer is a ter-polymer or SBS polymer that balances the Ductility of the aminated wax with rigidity to provide a balanced movement of the pavement surface and retraction to mitigate against surface cracking.

One of the considerations in the development of the DOT-C Technology Tack Coat concept is the ability for any simple Aggregate Mixing Plant or simple Asphalt Blending Plant to produce the Tack Coat without the need for expensive and sophisticated equipment such as High Shear Siefer Mills and which costs in excess of 0.75 million USD to install. Ultrabond needs such high cost equipment and therefore cannot be produced at remote locations or by smaller contractors.

The primary function of a Tack Coat is to bond the old pavement substrate with the newly paved overlay aggregate mixture and prevent delamination due to fatigue from traffic loadings and temperature cycling. A secondary function is for the Tack Coat to perform as a membrane layer to permit flexibility and mitigate against cracking as well as prevent water permeation into the pavement and which is necessary to prevent the stripping of the lower pavement layer and cracking with freezing as the entrapped water expands upon turning into ice.

DOT-C10 Tack Coat and DOTC-12 Tack Coat

DOT-C10 Tack Coat is based upon the DOT-C10 asphalt formulation shown above comprising Base Binder PG 64-22 plus Hydrogreen S Rejuvenator plus Aminated Wax and all of are instantly miscible/soluble at 150° C./302° F. with simple stirring and pump circulation. This formulation is suited to those geographic regions that are not susceptible to low ambient temperatures such as the Southern USA States. As can be seen from the Table of Properties, this formulation has all of the performance properties required for ease of application as well as superior performance.

DOT-C12 Tack Coat is based upon the DOT-C12 asphalt formulation shown above that includes an Elastomeric Polymer that disperses into the asphalt binder without the need for the expensive High Shear milling equipment. The logic for this inclusion is to design the Tack Coat to deliver the desired increased flexibility needed for much colder geographic regions such as the Northern USA states and Alaska where extreme low temperatures require a higher level of flexibility.

TABLE 2

Measured Asphalt Bond Strength Data

| Tack Type | Surface | Rate | Sample Diameter, in | Sample Area, in^2 | Mill Orientation, ° | Max Load, lbs | Bond Strength, psi | Average Bond Strength, psi |
|---|---|---|---|---|---|---|---|---|
| C10 | Unmilled | 0.08 | 5.90 | 27.33 | — | 6300 | 230.5 | 230.0 |
| | | | 5.90 | 27.32 | — | 5600 | 205.0 | |
| | | | 5.90 | 27.30 | — | 6950 | 254.6 | |
| | | 0.13 | 5.90 | 27.33 | — | 6600 | 241.5 | 236.2 |
| | | | 5.90 | 27.35 | — | 6075 | 222.1 | |
| | | | 5.90 | 27.34 | — | 6700 | 245.1 | |
| C10 | Milled | 0.08 | 5.90 | 27.31 | — | 5525 | 202.3 | 224.7 |
| | | | 5.89 | 27.28 | — | 6350 | 232.7 | |
| | | | 5.90 | 27.30 | — | 6525 | 239.0 | |

TABLE 2-continued

Measured Asphalt Bond Strength Data

| Tack Type | Surface | Rate | Sample Diameter, in | Sample Area, in 2 | Mill Orientation, ° | Max Load, lbs | Bond Strength, psi | Average Bond Strength, psi |
|---|---|---|---|---|---|---|---|---|
| | | 0.13 | 5.90 | 27.33 | — | 5175 | 189.3 | 193.1 |
| | | | 5.90 | 27.31 | — | 5750 | 210.5 | |
| | | | 5.90 | 27.29 | — | 4900 | 179.5 | |
| C12 | Unmilled | 0.08 | 5.90 | 27.31 | — | 7675 | 281.0 | 281.0 |
| | | | 5.90 | 27.31 | — | 8050 | 294.7 | |
| | | | 5.90 | 27.31 | — | 7300 | 267.3 | |
| | | 0.13 | 5.90 | 27.34 | — | 8175 | 299.0 | 273.8 |
| | | | 5.90 | 27.33 | — | 7775 | 284.5 | |
| | | | 5.90 | 27.33 | — | 6500 | 237.8 | |
| C12 | Milled | 0.08 | 5.90 | 27.34 | 0 | 5800 | 212.1 | 255.5 |
| | | | 5.90 | 27.32 | 45 | 7400 | 270.9 | |
| | | | 5.90 | 27.34 | 90 | 7750 | 283.5 | |
| | | 0.13 | 5.90 | 27.33 | 0 | 7250 | 265.3 | 245.3 |
| | | | 5.90 | 27.29 | 45 | 6525 | 239.1 | |
| | | | 5.90 | 27.32 | 90 | 6325 | 231.5 | |
| Com '455 | Unmilled | 0.08 | 5.90 | 27.36 | — | 10000 | 365.5 | 360.7 |
| | | | 5.90 | 27.35 | — | 10000 | 365.6 | |
| | | | 5.90 | 27.36 | — | 9600 | 350.9 | |
| | | 0.13 | 5.90 | 27.33 | — | 10000 | 365.9 | 366.1 |
| | | | 5.90 | 27.30 | — | 10000 | 366.3 | |
| | | | 5.90 | 27.32 | — | 10000 | 366.0 | |
| Com '455 | Milled | 0.08 | 5.90 | 27.35 | 0 | 10000 | 365.6 | 343.8 |
| | | | 5.90 | 27.29 | 45 | 8175 | 299.5 | |
| | | | 5.90 | 27.30 | 90 | 10000 | 366.3 | |
| | | 0.13 | 5.90 | 27.35 | 0 | 9900 | 362.0 | 345.4 |
| | | | 5.90 | 27.31 | 45 | 8425 | 308.5 | |
| | | | 5.90 | 27.34 | 90 | 10000 | 365.8 | |

Table 2 provides the Bond Strength data set comparing DOT-C10 and DOT-C12 with Com '455 and the following points are pertinent and relevant to the data presented:
1. The minimum Bond Strength per Alabama DOT method ALDOT 430 is 100 psi and which minimum value is exceeded by far for both milled and un-milled surfaces for DOT-C10, DOT-C12 and Com '455.
2. In all cases the differential between the milled and un-milled surface Bond Strengths is about the same and this signifies that the surface texture plays a dominant role in the value of the Bond Strength. The un-milled surfaces being relatively smoother have a more even coating of the Tack Coat and therefore more available surface contact points at the mix substrate interfaces and for this reason will have a higher Bond Strength as to be expected.
3. High Bond strength, up to a point is good for adhesion over the life of the pavement and endured traffic load and temperature fatigue cycles. However, a degree of flexibility in the Bond is essential to permit some pliability and movement under such pavement fatigue stresses and strains described above. If such flexibility is not present the Tack Coat bond will crack and the integrity of the pavement will be compromised and it will fail prematurely. Therefore extremely high Bond Strengths such as that exhibited by the Com '455 being too brittle will crack and work against the concept of bonding and rather cause pavement failure.

TABLE 3

Drive On Tack Coat (DOT-C) SUMMARY OF RESULTS

| Property | Test Method | DOT-C10 | DOT-C12 | COM '455 |
|---|---|---|---|---|
| Rotational viscosity at 150° C./302° F., cps | AASHTO T316 | 137.50 | 212.50 | 735.5 |
| Rotational Viscosity at 160° C./320° F., cps | AASHTO T316 | 100.00 | 162.50 | 475 |
| Softening Point, ° C./° F. | ASTM D3104 | 264.7/129.3 | 264.1/128.9 | 194.5/90.3 |
| Ductility at 25° C., cm | ASTM D113-07 | 90 | 39 | 0 |
| Elastic Recovery at 25° C., % | AASHTO T301 | 17.5 | 15 | 0 |
| Needle Penetration at 25° C., 1/10 mm (for the tack coat) | AASHTO T49 | 35 | 30 | 9 |
| Needle Penetration at 25° C., 1/10 mm (for the Base Asphalt PG 64-22) | | 65 | 65 | |

This TABLE 3 provides results for various testing on the three Tack Coats.

Finally, all articles, books, information, journals, magazines, materials, newsletters, newsletters, online materials, patent applications, patent publications, periodicals, publications, texts, and treatises, and/or any other type of publication, cited in this application are herein incorporated by reference in their entirety as if each individual reference was specifically and individually set forth herein. It should be understood that incorporated information is as much a part of the application as filed as if the information was repeated in the application, and should be treated as part of the text of the application as filed.

While the present invention has been described as being useful for creating a bonded friction course pavement, it should be understood that the compositions, products and methods of the present invention may be useful in any form of pavement not just bonded friction course pavement. The present invention may find utility for any type of asphalt application such as roads, runways, athletic tracks, speedway tracks, parking lots, roofing surfaces, driveways, playground surfaces, sports surfaces, and the like, be it as the top surface layer, or as a below surface layer. The present invention may also be useful for creating a water-proof barrier between zones or around certain objects.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

The invention claimed is:

1. A paving composition comprising an aminated wax and an asphalt cement wherein the aminated wax is derived from castor oil.

2. A pavement structure comprising:
a substrate pavement layer;
a tack coat applied to the substrate pavement layer, wherein the tack coat comprises an asphalt cement with a pen value greater than 50 dmm at 25° C., wherein the tack coat comprises a softening point of 135° C. or higher, and, wherein the tack coat comprises a rotational viscosity at 150° C. of less than 600 cps.

3. The pavement structure of claim 2, wherein the tack coat comprises a rotational viscosity at 160° C. of less than 400 cps.

4. The pavement structure of claim 2, further comprising an asphalt layer applied to the tack coat.

5. A method of forming a pavement structure, comprising:
applying a tack coat to a substrate pavement layer, wherein the tack coat comprises an asphalt cement with a pen value greater than 50 dmm at 25° C., wherein the tack coat comprises a softening point of 135° C. or higher, and wherein the tack coat comprises a rotational viscosity at 150° C. of less than 600 cps.

6. The method of claim 5, wherein the tack coat comprises a rotational viscosity at 160° C. of less than 400 cps.

7. A pavement structure comprising:
a substrate pavement layer;
a tack coat applied to the substrate pavement layer, wherein the tack coat comprises an asphalt cement with a pen value greater than 50 dmm at 25° C., wherein the tack coat comprises a softening point of 135° C. or higher, and,
wherein the tack coat comprises at least one physical property of ductility values at 25° C. of greater than 1 cm, elastic recovery values at 25° C. of greater than 1%, or a bond strength in the range of about 100 psi to about 300 psi.

8. A method of forming a pavement structure, comprising:
applying a tack coat to a substrate pavement layer, wherein the tack coat comprises an asphalt cement with a pen value greater than 50 dmm at 25° C. wherein the tack coat comprises at least one physical property of ductility values at 25° C. of greater than 1 cm, elastic recovery values at 25° C. of greater than 1%, or a bond strength in the range of about 100 psi to about 300 psi.

9. A pavement structure comprising:
a substrate pavement layer;
a tack coat applied to the substrate pavement layer, wherein the tack coat comprises an asphalt cement with a pen value greater than 50 dmm at 25° C., wherein the tack coat further comprises an aminated wax derived from castor oil.

10. A method of forming a pavement structure, comprising:
applying a tack coat to a substrate pavement layer, wherein the tack coat comprises an asphalt cement with a pen value greater than 50 dmm at 25° C., and wherein the tack coat further comprises an aminated wax derived from castor oil.

11. A pavement structure comprising:
a substrate pavement layer;
a tack coat applied to the substrate pavement layer, wherein the tack coat comprises an aminated wax and an asphalt cement with a pen value greater than 50 dmm at 25° C. where the aminated wax is derived from castor oil.

12. The pavement structure of claim 11, wherein the tack coat comprises a softening point of 135° C. or higher.

13. The pavement structure of claim 11, further comprising an asphalt layer applied to the tack coat.

14. A method of forming a pavement structure comprising:
Applying a tack coat applied to a substrate pavement layer, wherein the tack coat comprises an aminated wax and an asphalt cement with a pen value greater than 50 dmm at 25° C., and where the aminated wax is derived from castor oil.

15. The pavement structure of claim 14, wherein the tack coat comprises a softening point of 135° C. or higher.

16. The method of claim 14, further comprising
allowing the tack layer to cool; and
applying an asphalt layer to the tack coat, the asphalt layer heated to a temperature sufficient to increase the adhesive properties of the tack coat.

17. A pavement structure comprising:
a substrate pavement layer;
a tack coat applied to the substrate pavement layer, wherein the tack coat comprises an aminated wax and an asphalt cement with a pen value greater than 50 dmm at 25° C., wherein the tack coat comprises a softening point of 135° C. or higher, and, wherein the tack coat comprises a rotational viscosity at 150° C. of less than 600 cps.

18. The pavement structure of claim 17, wherein the tack coat comprises a rotational viscosity at 160° C. of less than 400 cps.

19. A method of forming a pavement structure comprising:
Applying a tack coat applied to a substrate pavement layer, wherein the tack coat comprises an aminated wax and an asphalt cement with a pen value greater than 50 dmm at 25° C., wherein the tack coat comprises a softening point of 135° C. or higher, and wherein the tack coat comprises a rotational viscosity at 150° C. of less than 600 cps.

20. The method of claim 19, wherein the tack coat comprises a rotational viscosity at 160° C. of less than 400 cps.

21. A pavement structure comprising:
a substrate pavement layer;
a tack coat applied to the substrate pavement layer, wherein the tack coat comprises an aminated wax and an asphalt cement with a pen value greater than 50 dmm at 25° C., wherein the tack coat comprises at least one physical property of ductility values at 25° C. of greater than 1 cm, elastic recovery values at 25° C. of greater than 1%, or a bond strength in the range of about 100 psi to about 300 psi.

22. A method of forming a pavement structure comprising:
Applying a tack coat applied to a substrate pavement layer, wherein the tack coat comprises an aminated wax and an asphalt cement with a pen value greater than 50 dmm at 25° C.
wherein the tack coat comprises at least one physical property of ductility values at 25° C. of greater than 1 cm, elastic recovery values at 25° C. of greater than 1%, or a bond strength in the range of about 100 psi to about 300 psi.

23. A pavement structure comprising:
a substrate pavement layer;
a tack coat applied to the substrate pavement layer, wherein the tack coat comprises an asphalt cement and an aminated wax, where the aminated wax is derived from castor oil.

24. The pavement structure of claim 23, wherein the tack coat comprises a softening point of 135° C. or higher.

25. The pavement structure of claim 23, further comprising an asphalt layer applied to the tack coat.

26. A method of forming a pavement structure comprising:
Applying a tack coat to a substrate pavement layer, wherein the tack coat comprises an asphalt cement and an aminated wax, and where the aminated wax is derived from castor oil.

27. The method of claim 26, wherein the tack coat comprises a softening point of 135° C. or higher.

28. A pavement structure comprising:
a substrate pavement layer;
a tack coat applied to the substrate pavement layer, wherein the tack coat comprises an asphalt cement and an aminated wax, wherein the tack coat comprises a softening point of 135° C. or higher, wherein the tack coat comprises a rotational viscosity at 150° C. of less than 600 cps.

29. The pavement structure of claim 28, wherein the tack coat comprises a rotational viscosity at 160° C. of less than 400 cps.

30. A method of forming a pavement structure comprising:
Applying a tack coat to a substrate pavement layer, wherein the tack coat comprises an asphalt cement and an aminated wax, wherein the tack coat comprises a softening point of 135° C. or higher, and wherein the tack coat comprises a rotational viscosity at 150° C. of less than 600 cps.

31. The method of claim 30, wherein the tack coat comprises a rotational viscosity at 160° C. of less than 400 cps.

32. A pavement structure comprising:
a substrate pavement layer;
a tack coat applied to the substrate pavement layer, wherein the tack coat comprises an asphalt cement and an aminated wax wherein the tack coat at least one physical property of ductility values at 25° C. of greater than 1 cm, elastic recovery values at 25° C. of greater than 1%, or a bond strength in the range of about 100 psi to about 300 psi.

33. A method of forming a pavement structure comprising:
Applying a tack coat to a substrate pavement layer, wherein the tack coat comprises an asphalt cement and an aminated wax,
wherein the tack coat comprises at least one physical property of ductility values at 25° C. of greater than 1 cm, elastic recovery values at 25° C. of greater than 1%, or a bond strength in the range of about 100 psi to about 300 psi.

* * * * *